United States Patent
Kim et al.

(10) Patent No.: US 9,981,212 B2
(45) Date of Patent: May 29, 2018

(54) METHOD FOR MANUFACTURING POROUS GRAPHENE FILTER, POROUS GRAPHENE FILTER MANUFACTURED USING SAME, AND FILTER APPARATUS USING POROUS GRAPHENE FILTER

(71) Applicant: KOREA INSTITUTE OF ENERGY RESEARCH, Daejeon (KR)

(72) Inventors: Hee-Yeon Kim, Daejeon (KR); Guk-Hyeon Kwon, Andong-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 227 days.

(21) Appl. No.: 14/954,073

(22) Filed: Nov. 30, 2015

(65) Prior Publication Data

US 2017/0151516 A1    Jun. 1, 2017

(51) Int. Cl.
*B01D 53/02*    (2006.01)
*B01D 39/20*    (2006.01)

(52) U.S. Cl.
CPC ...... *B01D 39/2055* (2013.01); *B01D 2239/04* (2013.01)

(58) Field of Classification Search
CPC ................. B01D 2239/04; B01D 39/2055
See application file for complete search history.

(56) References Cited

U.S. PATENT DOCUMENTS

| | | |
|---|---|---|
| 2013/0270188 A1 | 10/2013 | Karnik et al. |
| 2014/0054505 A1 | 2/2014 | Tse et al. |
| 2015/0122814 A1* | 5/2015 | Tichborne ............ B64D 37/32 220/88.3 |

FOREIGN PATENT DOCUMENTS

| | | |
|---|---|---|
| JP | 2009-231810 A | 10/2009 |
| JP | 2013-173660 A | 9/2013 |
| JP | 2013-536077 A | 9/2013 |
| JP | 2014-185074 A | 10/2014 |
| JP | 2014-241297 A | 12/2014 |
| JP | 2015-516286 A | 6/2015 |
| JP | 2015-176725 A | 10/2015 |
| KR | 10-2012-0022164 A | 12/2012 |
| KR | 10-2013-0033794 A | 4/2013 |

OTHER PUBLICATIONS

Dacheng Wei et al., Lett, vol. 9, No. 5, Mar. 27, 2009., pp. 1752-1758.

* cited by examiner

*Primary Examiner* — Christopher P Jones
(74) *Attorney, Agent, or Firm* — Sughrue Mion, PLLC (57) ABSTRACT

Disclosed herein are porous graphene filters, each consisting of a carbon monoatomic layer having small holes formed therein during the graphene formation, a plurality of the porous graphene filters being used to selectively filter a specific material from a mixture of at least two different materials, a method for manufacturing the same, and a filtering apparatus using the same. The method comprises: separately forming a first graphene filter having a first hole of a first size and a second graphene filter having a second hole of a second size, during deposition of carbon atoms generated from a carbon source for formation of graphene, by substituting the carbon atoms, in part, with a substitution atom generated from a substitution source, the second size being larger than the first size; and arranging the first graphene filter and the second graphene filter in a filter body equipped with an inlet and an outlet.

12 Claims, 7 Drawing Sheets

METHOD FOR MANUFACTURING POROUS GRAPHENE FILTER, POROUS GRAPHENE FILTER MANUFACTURED USING SAME, AND FILTER APPARATUS USING POROUS GRAPHENE FILTER

BACKGROUND OF THE INVENTION

1. Field of the Invention

The present disclosure relates to a method for manufacturing a porous graphene filter, and a porous graphene filter manufactured by the method. More particularly, the present disclosure pertains to a method for manufacturing a porous graphene filter capable of selectively filtering a specific material from a mixture of at least two different materials, a porous graphene filter manufactured by the method, and a filtering apparatus using the porous graphene filter.

2. Description of the Related Art

Rapid development has been achieved in graphene technology over recent years.

Consisting of a planar monoatomic layer of carbon atoms, graphene has various advantages: it is far superior in conductivity to copper, it allows for faster electron mobility therein than in silicon, and it has even higher strength than steel. With these properties, graphene finds applications in a wide spectrum of fields including ultra-high speed semiconductors, flexible displays employing transparent electrodes, computer parts, high-efficiency solar cells, etc.

Technical development is ongoing in the area of graphene for use in semiconductors, displays, and solar cells, with particular direction toward avoiding the formation of defects, such as through-holes, therein.

RELATED ART DOCUMENT

Patent Document (Patent Document 0001) Korean Patent Unexamined Application Publication No. 10-2013-0033794 "Filter Fabrication Method and the Filter Fabricated thereby" (issued Apr. 4, 2013)

SUMMARY OF THE INVENTION

The present disclosure provides porous graphene filters, each consisting of a carbon monoatomic layer having small holes formed therein during the graphene formation, a plurality of the porous graphene filters being used to selectively filter a specific material from a mixture of at least two different materials, a method for manufacturing the same, and a filtering apparatus using the same.

An aspect of the present disclosure provides method for manufacturing a porous graphene filter, comprising: forming a first graphene filter having a first hole of a first size, during deposition of carbon atoms generated from a carbon source for formation of graphene, by substituting the carbon atoms, in part, with a substitution atom generated from a substitution source; forming a second graphene filter having a second hole of a second size, during deposition of carbon atoms generated from a carbon source for formation of graphene, by substituting the carbon atoms, in part, with a substitution atom generated from a substitution source, the second size being larger than the first size; arranging the first graphene filter and the second graphene filter in a filter body equipped with an inlet and an outlet.

In some embodiments, the substitution sources respectively used in the formation of the first graphene filter having the first hole and the second graphene filter having the second hole independently contain a nitrogen atom.

In some embodiments, the substitution source is provided in a smaller amount upon the formation of the first graphene filter, compared to the formation of the second graphene filter.

In some embodiments, wherein the carbon source contains at least one selected from the group consisting of methane ($CH_4$), methanol ($CH_3OH$), carbon monoxide (CO), ethane ($C_2H_6$), ethylene ($C_2H_4$), ethanol ($C_2H_5OH$), acetylene ($C_2H_2$), acetone ($CH_3COCH_3$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$).

In some embodiments, the substitution source contains at least one selected from the group consisting of ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide ($(CH_3)_2NCHO$), lithium nitride ($Li_3N$), and cyanuric chloride ($C_3Cl_3N_3$).

In some embodiments, the carbon source and the substitution source are simultaneously vaporized when the first graphene filter or the second graphene filter is formed.

Another aspect of the present disclosure provides a porous graphene filter, comprising: a first graphene filter in which a first hole with a first size is formed by substituting a part of carbon atoms having a crystal defect at a covalently bonded portion in the graphene with a substitution atom; a second graphene filter in which a second hole with a second size is formed by substituting a part of carbon atoms having a crystal defect at a covalently bonded portion in the graphene with a substitution atom; and a filter body in which the first graphene filter and the second graphene filter are immobilized against a path through which a mixture of a plurality of materials moves after the mixture is introduced into the filter body.

In some embodiments, the first graphene filter and the second graphene filter are independently in a film or cylindrical form.

A further aspect of the present invention provides a filtering apparatus, comprising: a mixture feeder for intermittently providing a predetermined amount of a mixture consisting of materials different in size from each other; a graphene filter comprising: a filter body equipped with an inlet through which the mixture is introduced into the filter body, and at least two outlets at a side of the filter body; and at least one graphene film having holes formed therein, positioned between the outlets within the filter body, for separating the individual materials of the mixture from each other; and a recovery unit, connected to the outlet, for recovering the separated individual materials.

In some embodiments, wherein the mixture feeder comprises: a mixture reservoir for supplying the mixture; a container for receiving a predetermined amount of the mixture; and a discharge unit for discharging the mixture from the container.

In some embodiments, the discharge unit comprises a blower for providing air or inert gas to the container.

In some embodiments, the filtering apparatus further comprises: electric valves associated with the mixture feeder, the graphene filter, and the recovery unit; and a valve controller for controlling the electric valves.

In some embodiments, the graphene filter comprises: a first graphene filter, arranged within the filter body, with first holes of a first size formed therein; and a second graphene filter, arranged facing the first graphene filter within the filter body, with second holes of a second size formed therein.

As described, graphene films, each consisting of a monoatomic layer structure, can be fabricated in such a way that very small holes are formed therein during graphene formation, and the resulting porous graphene films are used as graphene filters to selectively filter or separate specific materials from a mixture containing the materials.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components. Below, a description will be given of preferred embodiments of the present invention in conjunction with the accompanying drawings. Throughout the accompanying drawings, the same reference numerals are used to designate the same or similar components. In the following description of the present invention, when it is determined that the detailed description of the related art would obscure the gist of the present invention, the description thereof will be omitted.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention.

The technical term "graphene", as frequently used herein, refers to a monoatomic layer structure of carbon having a hexagonal ring as a fundamental repeat unit in which one atom forms each vertex.

In the present disclosure, however, a monoatomic layer structure in which five or seven carbon atoms covalently bonded together as a basic repeat unit is also defined as "graphene".

The technical term "crystal defect" or "defect", as frequently used in connection with graphene, is defined as the break of at least one of the covalent bonds formed between some carbon atoms of graphene with the aim of substituting a nitrogen atom for the carbon atom.

Figure 1:
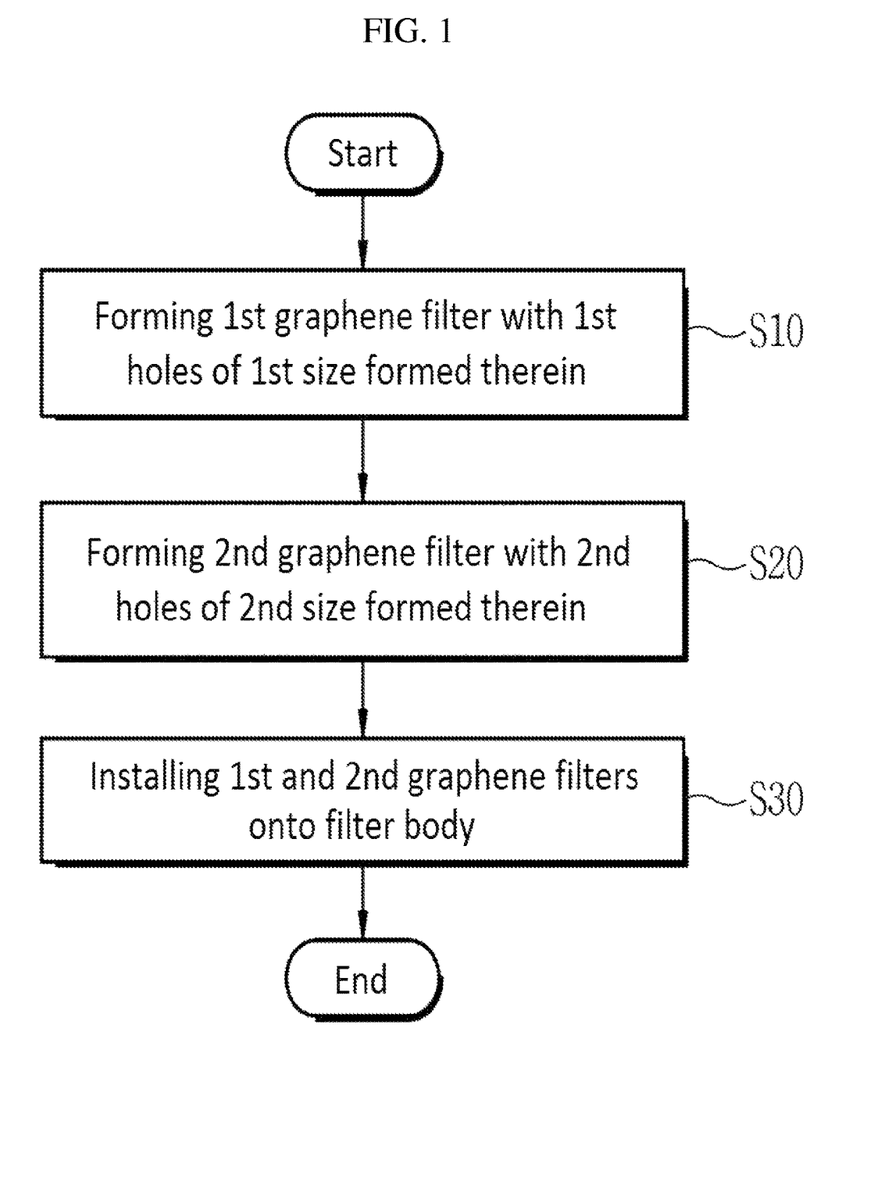
FIG. 1 is a flow chart of illustrating a method for manufacturing a porous graphene filter in accordance with some embodiments of the present disclosure.
Figure 2:
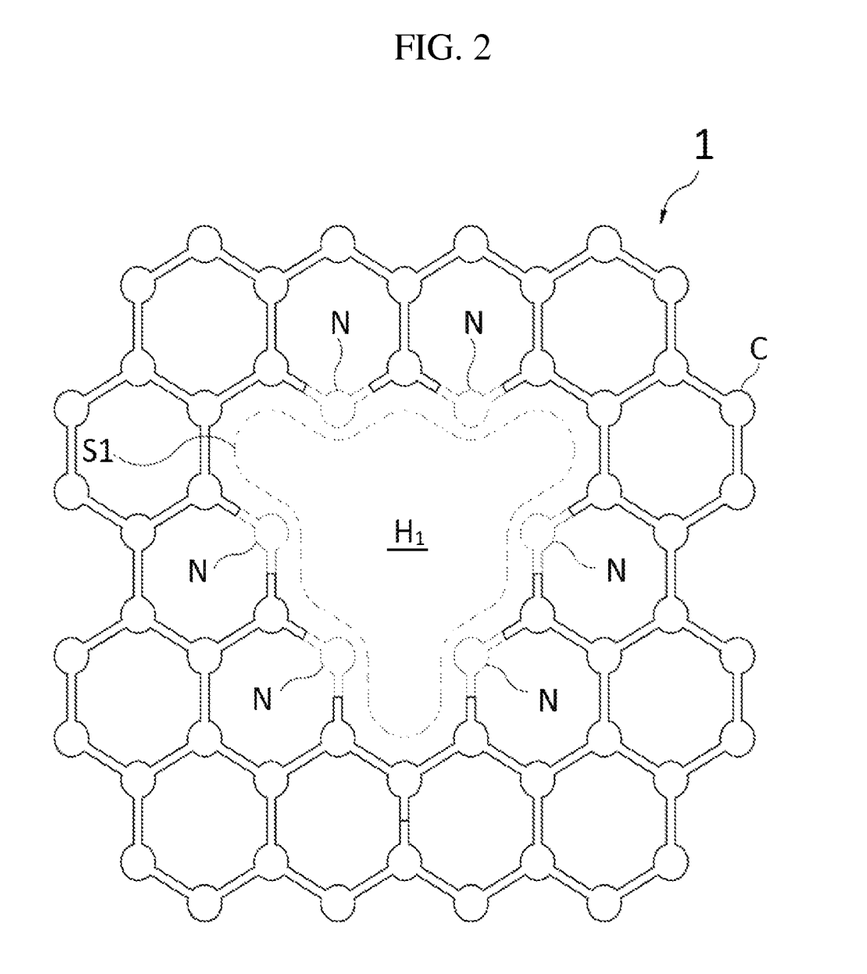
FIG. 2 is a plane view of the first graphene filter described in FIG. 1.
Figure 3:
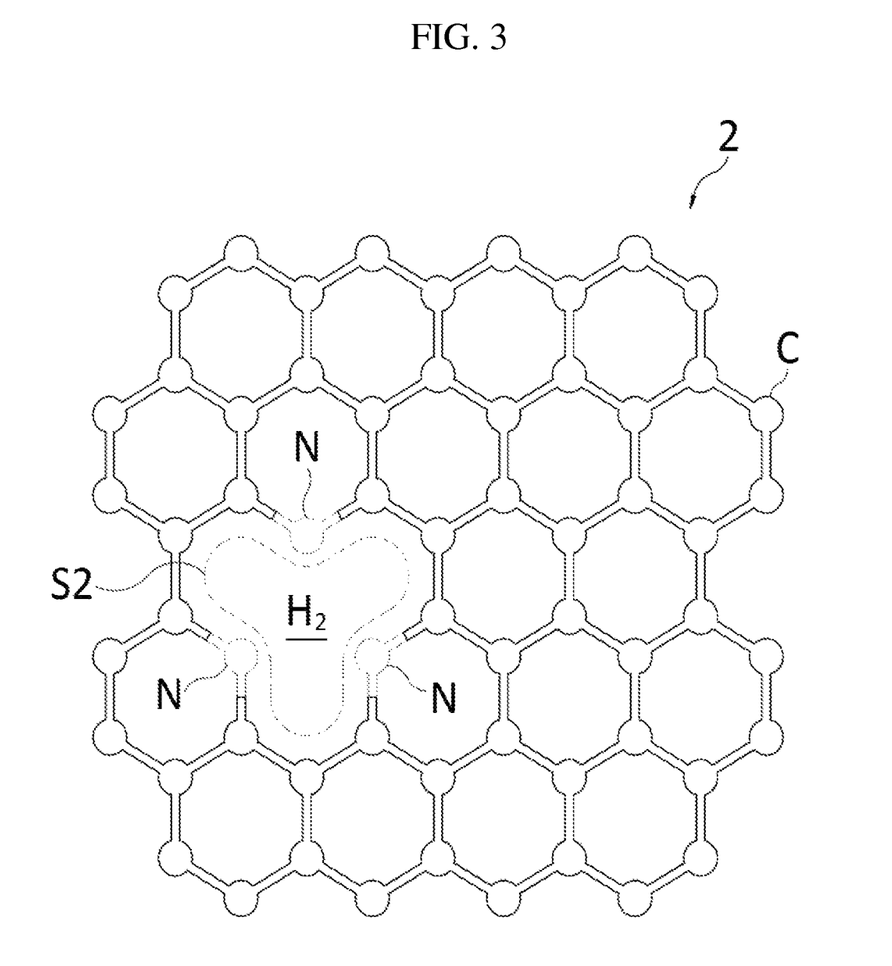
FIG. 3 is a plane view of the second graphene filter described in FIG. 1.

FIG. 1 is a flow chart of illustrating a method for manufacturing a porous graphene filter in accordance with some embodiments of the present disclosure. FIGS. 2 and 3 are plane views of the first graphene filter and the second graphene filter described in FIG. 1, respectively.

With reference to FIGS. 1 and 2, first, a first graphene filter 1 for use in the manufacture of the porous graphene filter is fabricated to have a first hole ($H_1$) with a first size ($S1$) on average (step S10).

In step S10 of fabricating a first graphene filter 1 in which a first hole ($H_1$) with a first size ($S1$) is formed, a carbon source containing a carbon precursor decomposable into carbon and hydrogen atoms at a high temperature is vaporized to form a graphene film.

In some embodiments of the present disclosure, the vaporization of the carbon source in conjunction with a deposition furnace allows for the simpler production of a porous graphene filter, compared to conventional processes.

According to particular embodiments of the present disclosure, materials available as the carbon source for the first graphene filter 1 may be hydrocarbons, which can be thermally decomposed into carbon atoms and hydrogen atoms, as exemplified by methane ($CH_4$), ethane ($C_2H_6$), ethylene ($C_2H_4$), acetylene ($C_2H_2$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_2$), benzene ($C_6H_6$), toluene ($C_7H_8$), and xylene ($C_8H_{10}$). Other examples include methanol ($CH_3OH$), carbon monoxide (CO), ethanol ($C_2H_5OH$), and acetone ($CH_3COCH_3$), which can also produce carbon and hydrogen atoms by pyrolysis.

During the formation of graphene with carbon atoms generated by the vaporization of the carbon source, a substitution source (or doping source) is vaporized to generate a substitution atom that causes a crystal defect to a part of the carbon atoms in the graphene and substitutes for the carbon atoms having a crystal defect, in order to form the first hole ($H_1$) having a first size ($S1$) on average in the graphene.

For the substitution source, a nitrogen precursor comprising a nitrogen compound may be available in some embodiments of the present disclosure.

Examples of the nitrogen compounds available as the substitution source for use in the formation of the first hole ($H_1$) in the first graphene filter 1 include: ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide ($(CH_3)_2NCHO$), lithium nitride ($Li_3N$), and cyanuric chloride ($C_3Cl_3N_3$).

In some embodiments of the present disclosure, the carbon source for providing carbon atoms for use in the formation of the first graphene filter 1, and the substitution source for providing a substituent for use in the formation of a first hole ($H_1$) having a first size ($S1$) on average during the formation of the first graphene may be vaporized in a simultaneous manner in respective vessels.

After simultaneous vaporization, evaporants from the carbon source and the substitution source are independently introduced into a deposition furnace in which a process condition suitable for the formation of the first graphene filter 1 is established, and are mixed therein.

The vaporized carbon source is thermally decomposed into carbon atoms and hydrogen atoms in the deposition furnace. The hydrogen atoms are released outside the deposition furnace while the carbon atoms are deposited on a substrate to form a monoatomic layer structure in the deposition furnace.

During the formation of carbon atoms into a film in the deposition furnace, the substitution source introduced into the deposition furnace is decomposed in the deposition furnace to generate nitrogen atoms that cause a crystal defect by acting on the covalently bonded portion of a part of carbon atoms and bond to the broken covalently bonded portion of the carbon atoms.

With the substitution of the nitrogen atoms for the carbon atoms of the crystal defect, a first graphene filter 1 in which a first hole ($H_1$) having a first size ($S1$) on average is formed is fabricated.

In some embodiments of the present disclosure, when more carbon atoms are disconnected from the lattice and a greater number of nitrogen atoms participate in the formation of the crystal defect, the first hole ($H_1$) of the first graphene filter 1 has an increased first size ($S1$).

In other words, the number of the first holes ($H_1$) formed in the first graphene filter 1 and the mean value of the first sizes of the first holes ($H_1$) are determined according to the ratio of the carbon source to the substitution source or the concentration of the substitution source.

An increase in the level of the substitution source relative to the carbon source induces the generation of crystal defects associated with more carbon atoms in the graphene, and nitrogen atoms are bonded in place of the carbon atoms, thereby increasing the number and the mean value of the first size of the first holes ($H_1$).

On the other hand, a decrease in the level of the substitution source relative to the carbon source induces the generation of crystal defects associated with fewer carbon atoms in the graphene, and nitrogen atoms are bonded in place of the carbon atoms, thereby decreasing the number and the mean value of the first sizes of the first holes ($H_1$).

Data about the mean value and deviation of the first sizes ($S1$) of the first holes ($H_1$) formed in the graphene can be obtained with experiments in which the ratio of carbon source to substitution source is changed.

With reference to FIGS. 1 and 3, a second graphene filter 2 is fabricated to have a second hole ($H_2$) with a second size ($S2$) on average (step S20) after or during the fabrication of the first graphene filter 1.

In step S20 of fabricating a second graphene filter 2 in which a second hole ($H_2$) with a mean value of a second size ($S2$) is formed, a carbon source containing a carbon precursor is vaporized to form the graphene filter 2.

According to particular embodiments of the present disclosure, materials available as the carbon source for the second graphene filter 2 may be hydrocarbons, which can be thermally decomposed into carbon atoms and hydrogen atoms, as exemplified by methane ($CH_4$), ethane ($C_2H_6$), ethylene ($C_2H_4$), acetylene ($C_2H_2$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$). Other examples include methanol ($CH_3OH$), carbon monoxide ($CO$), ethanol ($C_2H_5OH$), and acetone ($CH_3COCH_3$), which can also produce carbon and hydrogen atoms by pyrolysis.

In some embodiments of the present disclosure, the carbon source available for the fabrication of the second graphene filter 2 may be the same as or different from that used for the fabrication of the first graphene filter 1.

During the fabrication of the second graphene filter 2 with carbon atoms generated by the vaporization of the carbon source, a substitution source (or doping source) is vaporized to generate a substitution atom for occupying the covalent bond broken by a crystal defect that is created to form the second hole ($H_2$) having a second size ($S2$) on average in the graphene.

For the substitution source of the second graphene filter 2, a nitrogen precursor comprising a nitrogen compound may be available in some embodiments of the present disclosure.

Examples of the nitrogen compounds available as the substitution source for use in the formation of the second hole ($H_2$) in the second graphene filter 2 include: ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3$)$_2$NCHO), lithium nitride ($Li_3N$), and cyanuric chloride ($C_3Cl_3N_3$).

In some embodiments of the present disclosure, the substitution source available for the fabrication of the second graphene filter 2 may be the same as or different from that used for the fabrication of the first graphene filter 1.

In some embodiments of the present disclosure, the carbon source for providing carbon atoms for use in the formation of the second graphene filter 2, and the substitution source for providing a substituent for use in the formation of a second hole ($H_2$) having a second size ($S2$) on average during the formation of the second graphene filter 2 may be vaporized in a simultaneous manner in respective vessels.

After simultaneous vaporization, the evaporants from the carbon source and the substitution source are independently introduced into a deposition furnace in which a process condition suitable for the formation of the second graphene filter 2 is established, and are mixed therein.

The vaporized carbon source is thermally decomposed into carbon atoms and hydrogen atoms in the deposition furnace. The hydrogen atoms are released outside the deposition furnace while the carbon atoms are deposited on a substrate to form a monoatomic layer structure in the deposition furnace.

During the formation of carbon atoms into a film in the deposition furnace, the substitution source introduced into the deposition furnace is decomposed in the deposition furnace to generate nitrogen atoms that cause a crystal defect by acting on the covalently bonded portion of a part of carbon atoms and bond to the broken covalently bonded portion of the carbon atoms.

With the substitution of the nitrogen atoms for the carbon atoms of the crystal defect, a second graphene filter 2 in which a second hole ($H_2$) having a second size ($S2$) on average is formed is fabricated.

In particular embodiments of the present disclosure, the number of the second holes ($H_2$) formed in the second graphene filter 2 and the mean value of the second sizes of the second holes ($H_2$) are determined according to the ratio of the carbon source to the substitution source or the concentration of the substitution source.

An increase in the level of the substitution source relative to the carbon source induces the generation of crystal defects associated with more carbon atoms in the graphene, and nitrogen atoms are bonded in place of the carbon atoms, thereby increasing the number and the mean value of the second sizes $S2$ of the second holes ($H_2$).

On the other hand, a decrease in the level of the substitution source relative to the carbon source induces the generation of crystal defects associated with fewer carbon atoms in the graphene, and nitrogen atoms are bonded in place of the carbon atoms, thereby decreasing the number and the mean value of the second sizes S2 of the second holes ($H_2$).

Data about the mean value and deviation of the second sizes (S2) of the second holes ($H_2$) formed in the graphene can be obtained with experiments in which the ratio of carbon source to substitution is changed.

On average, the second size (S2) of the second holes ($H_2$) formed on the second graphene filter 2 in Step S20 may be smaller than the first size (S1) of the first holes ($H_1$) formed on the first graphene filter 1 in the step S10.

In this regard, the largest one of the second holes ($H_2$) on the second graphene filter 2 may be smaller than the smallest one of the first holes ($H_1$) on the first graphene filter 1.

The second mean size (S2) of the second holes 2 formed in the second graphene filter 2, although shown and described to be smaller than the mean size (S1) of the first holes 1 formed in the first graphene filter 1, may be larger than the mean size (S1).

According to some embodiments of the present disclosure, the first graphene filter 1 in which first holes ($H_1$) are formed to have a first size (S1) on average and the second graphene filter 2 in which second holes ($H_2$) are formed to have a second size (S2) on average may be sequentially fabricated in one deposition furnace or separately in respective furnaces.

After being fabricated, both the first graphene filter 1 in which the first holes ($H_1$) are formed to have the first size (S1) on average and the second graphene filter 2 in which the second holes ($H_2$) are formed to have the second size (S2) on average are applied to a filter body to afford a porous graphene filter (step S30).

The filter body provides a path through which a mixture of at least two different materials passes, and the first graphene filter 1 and the second graphene filter 2, respectively fabricated in steps S10 and S20, are arranged in the path to filter off materials of interest through the first and the second holes ($H_1$ and $H_2$) of the first and the second graphene filters 1 and 2.

For instance, the porous graphene filter may be applied to the selective filtration of carbon dioxide from air, impurities from water, particular matters from vehicle emissions, and impurities or particular materials from blood.

Figure 4:
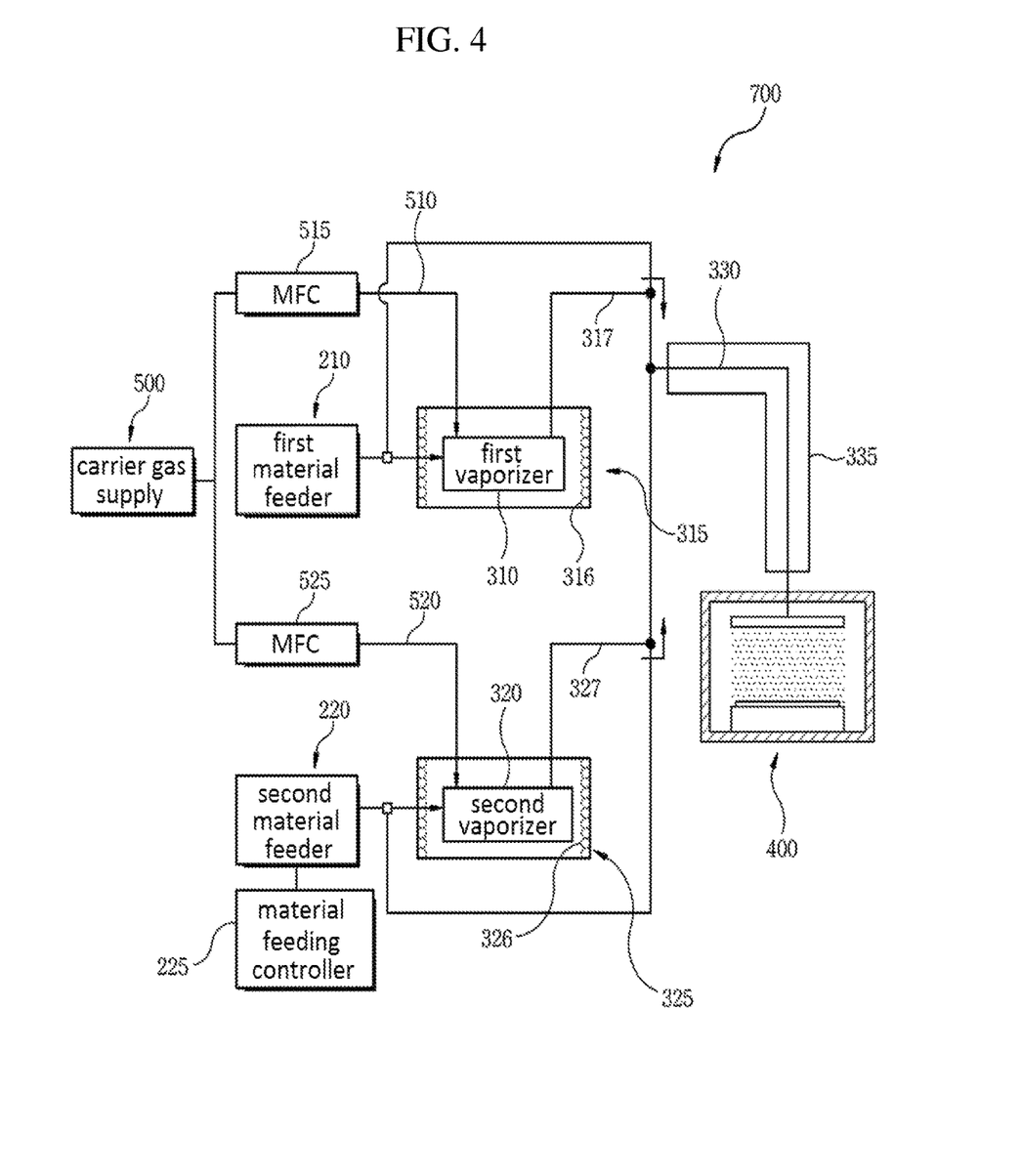
FIG. 4 is a block diagram illustrating an apparatus for manufacturing the first or the second graphene filter illustrated in FIG. 1.

FIG. 4 is a block diagram illustrating an apparatus 700 for manufacturing a porous graphene filter.

Referring to FIG. 4, the apparatus 700 is configured to fabricate the first and the second graphene filter shown in FIG. 1

In some embodiments of the present disclosure, both the first graphene filter 1 and the second graphene filter 2 may be fabricated using one apparatus 700 for manufacturing a porous graphene filter. Alternatively, the first graphene filter 1 or the second graphene filter 2 may be fabricated using respective apparatuses 700 for manufacturing a porous graphene filter.

The apparatus 700 for manufacturing a porous graphene filter may comprise a material feeder, a simultaneous vaporizer, and a deposition furnace 400. In addition, the apparatus 700 for manufacturing a porous graphene filter may further comprise a carrier gas supply 500.

The material feeder may comprise a first material feeder 210 and a second material feeder 220.

The simultaneous vaporizer may comprise a first vaporizer 310 and a second vaporizer 320.

By the first material feeder 210, a carbon source for use in the formation of graphene is fed into the first vaporizer 310 of the simultaneous vaporizer as described later.

The carbon source that is fed from the first material feeder 210 to the vaporizer 310 may be a carbon precursor including a hydrocarbon, which can be thermally decomposed into carbon atoms and hydrogen atoms.

Examples of the carbon precursor fed from the first material feeder 210 include methane ($CH_4$), methanol ($CH_3OH$), carbon monoxide (CO), ethane ($C_2H_6$), ethylene ($C_2H_4$), ethanol ($C_2H_5OH$), acetylene ($C_2H_2$), acetone ($CH_3COCH_3$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$), which can also produce carbon and hydrogen atoms by pyrolysis.

In some embodiment of the present disclosure, the carbon precursor may be stored as a gas phase in the first material feeder 210. In this case, the carbon precursor may be directly supplied into the deposition furnace 400 with the bypass of the first vaporizer 310 of the simultaneous vaporizer.

The second material feeder 220 acts to supply into the second vaporizer 320 of the simultaneous vaporizer a substitution source (or doping source) for use in the formation of through-holes in the graphene.

According to some embodiments of the present disclosure, the second material feeder 220 for supplying the substitution source into the second vaporizer 320 is associated with a material feeding controller 225 for precisely controlling the concentration of the substitution source and the feed rate of the substitution source.

As such, the material feeding controller 225 can alter the feed rate of the substitution source supplied to the second vaporizer 320, allowing for the fabrication of the first graphene filter 1, with first holes ($H_1$) of a first size (S1) formed therein as shown in FIG. 2, and the second graphene filter 2, with second holes ($H_2$) of a second size (S2) formed therein as shown in FIG. 3.

Although the concentration and feed rate of the substitution source supplied from the second material feeder 220 to the second vaporizer 320 is described to be controlled by the material feeding controller 225 in the foregoing, each of the first and second material feeders 210 and 220 may be provided with an electric valve or mass flow controller (MFC) for controlling feeding rates of the carbon source and the substitution source in accordance with some embodiment of the present disclosure.

The substitution source supplied from the second material feeder 220 to the second vaporizer 320 may be a nitrogen precursor.

Examples of the nitrogen precursor available as the substitution source that is to be supplied to the second material feeder 220 as shown in FIG. 4 include: ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3)_2NCHO$), lithium nitride ($Li_3N$), and cyanuric chloride ($C_3Cl_3N_3$).

In some embodiments of the present disclosure, when the nitrogen precursor is fed as a gas phase from the second material feeder 220, it may be transmitted directly to the deposition furnace 400, with the bypass of the second vaporizer 320 of the simultaneous vaporizer.

As described in the foregoing, the simultaneous vaporizer comprises the first vaporizer 310 and the second vaporizer 320.

Communicating with the first material feeder 210, the first vaporizer 310 may be fed with the carbon source, that is, a carbon precursor, from the first material feeder 210.

The first vaporizer 310 comprises a container that is provided with an inlet through which a carbon precursor to be vaporized is introduced into the container and with an outlet through which a vaporized carbon precursor is released from the container. The inlet communicates with the first material feeder 210 while the outlet is connected with the deposition furnace 400 as will be described later.

In order to thermally vaporize the carbon precursor supplied to the first vaporizer 310, a first heating furnace 315 may be provided outside the first vaporizer 310 while a heating wire 316 for generating heat may be arranged inside the first heating furnace 315. Various heat generating devices other than the heating wire 316 may be provided for the first heating furnace 315.

The second vaporizer 320 communicates with the second material feeder 220 and is supplied with a substitution source, e.g., a nitrogen precursor, from the second material feeder 220.

The second vaporizer 320 comprises a container that is provided with an inlet through which a nitrogen precursor to be vaporized is introduced into the container and with an outlet through which a vaporized nitrogen precursor is released from the container. The inlet communicates with the second material feeder 220 while the outlet is connected with the deposition furnace 400 as will be described later.

For use in thermally vaporizing the nitrogen precursor supplied to the second vaporizer 320, a second heating furnace 325 may be provided outside the second vaporizer 320 while a heating wire 326 for generating heat may be arranged inside the second heating furnace 325. Various heat generating devices other than the heating wire 326 may be provided for the first heating furnace 325.

Although the use of the first and second heating furnaces 315 and 325 comprising the heating wires 316 and 326 is described in the foregoing to vaporize the carbon and nitrogen precursors supplied to the respective first and second vaporizers 310 and 320, the carbon and the nitrogen precursor may be chemically vaporized by providing a reactive gas.

Meanwhile, the carrier gas supply 500 for supplying carrier gas communicates with both the first vaporizer 310 and the second vaporizer 320 so that the carrier gas transmits the carbon precursor and the nitrogen precursor respectively vaporized in the first vaporizer 310 and the second vaporizer 320 to the deposition furnace 400.

After being supplied from the carrier gas supply 500 to the first vaporizer 310 and the second vaporizer 320, inert gas, such as nitrogen, argon, etc., transmits the carbon precursor and the nitrogen precursor vaporized respectively in the first vaporizer 310 and the second vaporizer 320 into the deposition furnace 400.

In some embodiments of the present disclosure, the carrier gas supply 500 is connected with the first vaporizer 310 and the second vaporizer 320 via inert gas supplying pipes 510 and 520, respectively. The inert gas-supplying pipes 510 and 520 may be conjugated with respective mass flow controllers (MFC).

According to some embodiments of the present disclosure, the flow rates of the inert gas from the carrier gas supply 500 to the first vaporizer 310 and to the second vaporizer 320 may be differently controlled so as to fabricate the first graphene filter 1 in which first holes ($H_1$) of the first size (S1) are formed, and the second graphene filter 2 in which second holes ($H_2$) of the second size (S2) are formed.

Turning to FIG. 4, the outlet of the first vaporizer 310 through which the carbon precursor vaporized in the first vaporizer is released is connected with a first pipe 317 while the outlet of the second vaporizer 320 through which the nitrogen precursor vaporized in the second precursor 320 is released is connected with a second pipe 327.

Both the first pipe 317 and the second pipe 318 are convergent into a common pipe 330 that communicates with the deposition furnace 400.

The vaporized carbon precursor and the nitrogen precursor are transmitted through the first pipe 317 and the second pipe 327, respectively, and are mixed together in the common pipe 330 before entering the deposition furnace 400. Thus, the vaporized carbon and nitrogen precursors proceed in the form of a uniform mixture towards the deposition furnace 400.

In some embodiments of the present disclosure, the common pipe 330 may be equipped with a heating unit 335 so that the vaporized carbon and nitrogen precursors traveling through the common pipe respectively from the first pipe 317 and the second pipe 327 are prevented from being liquefied or deposited onto inside walls of the first and the second pipes 317 and 327.

The heating unit 335 may comprise, for example, a heating wire that can generate heat with the consumption of electric energy. The heating unit 335 heats the common pipe 330 to minimize the temperature change of the vaporized carbon and nitrogen precursors.

In some embodiments of the present disclosure, the heating unit 335, although described to be mounted onto the common pipe 330 where the vaporized carbon and nitrogen precursors are mixed in the foregoing, may be provided for each of the first pipe 317 and the second pipe 327.

Turning again to FIG. 4, the deposition furnace 400 serves to establish a process condition and atmosphere under which the first and the second graphene filters 1 and 2 shown in FIGS. 2 and 3 are fabricated with the carbon precursor supplied from the first vaporizer 310 through the first pipe 317 and the common pipe 330, and with the nitrogen precursor supplied from the second vaporizer 320 through the second pipe 327 and the common pipe 330.

The deposition furnace 400 establishing a process condition and atmosphere for forming the first and the second graphene filters 1 and 2 may be selected from the group consisting of chemical vapor deposition equipment, thermal chemical vapor deposition equipment, rapid thermal chemical vapor deposition equipment, inductive coupled plasma chemical vapor deposition equipment, and atomic layer deposition equipment.

Since a monoatomic layer is formed on a substrate disposed in the deposition furnace 400, atomic layer deposition may be employed in some embodiments of the present disclosure.

The substrate, disposed within the deposition furnace 400, onto which the first and the second graphene filters 1 and 2 are deposited, may be made of, for example, a metallic material that allows the first and the second graphene filters 1 and 2 to be easily separated from the substrate and which is unlikely to undergo deformation at a high temperature.

In some embodiments of the present disclosure, the metallic substrate disposed in the deposition furnace 400 may include a copper plate or a copper-plated plate.

Although the substrate, disposed in the deposition furnace 400, on which the first and the second graphene filters 1 and 2 are deposited, is described to be a copper plate or copper-plated plate in the foregoing, various metallic substrates may employed as long as they allow the first and the second graphene filters 1 and 2 to be easily released from the substrates.

Figure 5:
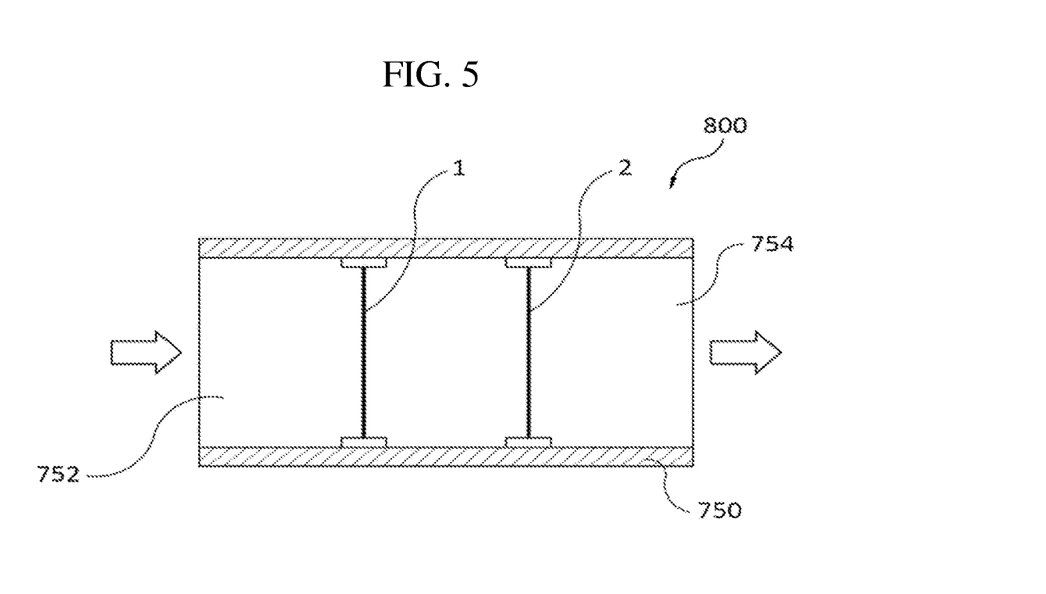
FIG. 5 is a cross-sectional view of a porous graphene filter according to some embodiments of the present disclosure.
Figure 6:
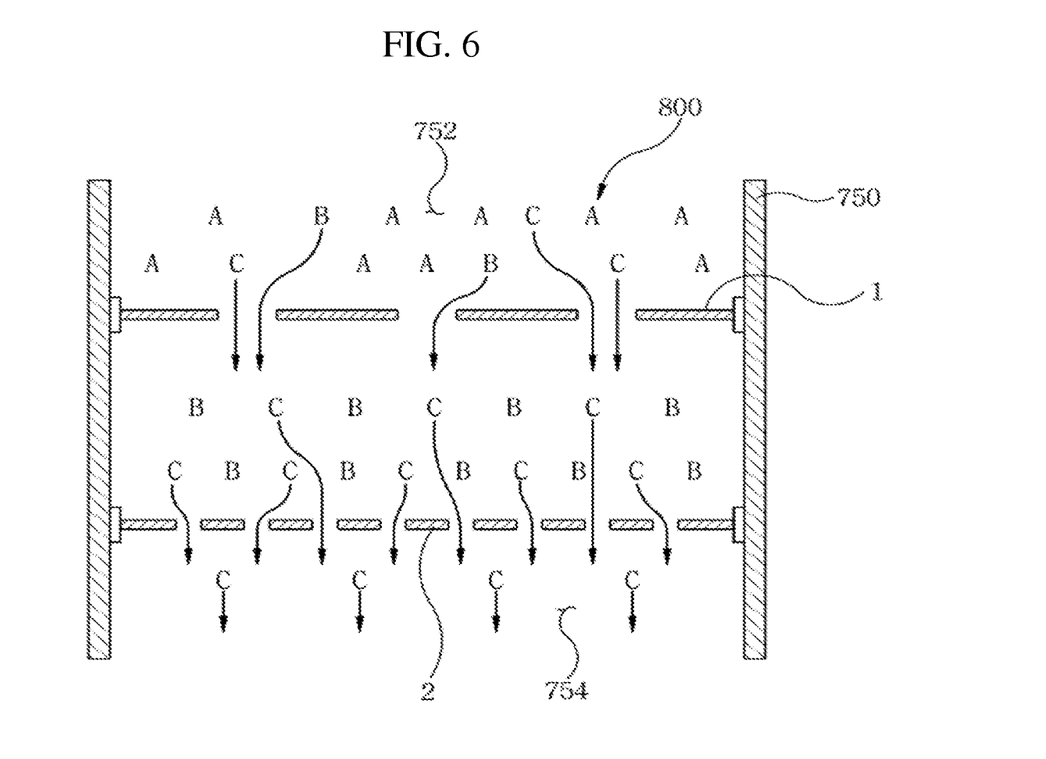
FIG. 6 is a conceptual view illustrating the filtration process of the porous graphene filter of FIG. 5.

FIG. 5 is a cross-sectional view of a porous graphene filter according to some embodiments of the present disclosure. FIG. 6 is a conceptual view illustrating the filtration process of the porous graphene filter of FIG. 5.

With reference to FIGS. 5 and 6, the porous graphene filter 800 comprises a first graphene filter 1, a second graphene filter 2, and a filter body 750.

The first graphene filter 1 may be fabricated by the method illustrated in FIG. 1 using the apparatus, shown in FIG. 4, for manufacturing the porous graphene filter. The first graphene filter 1 has the structure shown in FIG. 2.

The first graphene filter 1 is fabricated in such a way that, during the formation of graphene with carbon atoms generated by the vaporization of the carbon source, a substitution source is vaporized to generate substitution atoms, i.e., nitrogen atoms that cause a crystal defect to a part of the carbon atoms and substitute for the carbon atoms having crystal defect.

As shown in FIG. 2, the first graphene filter 1 has a first hole ($H_1$) with a first size (S1).

Figure 7:
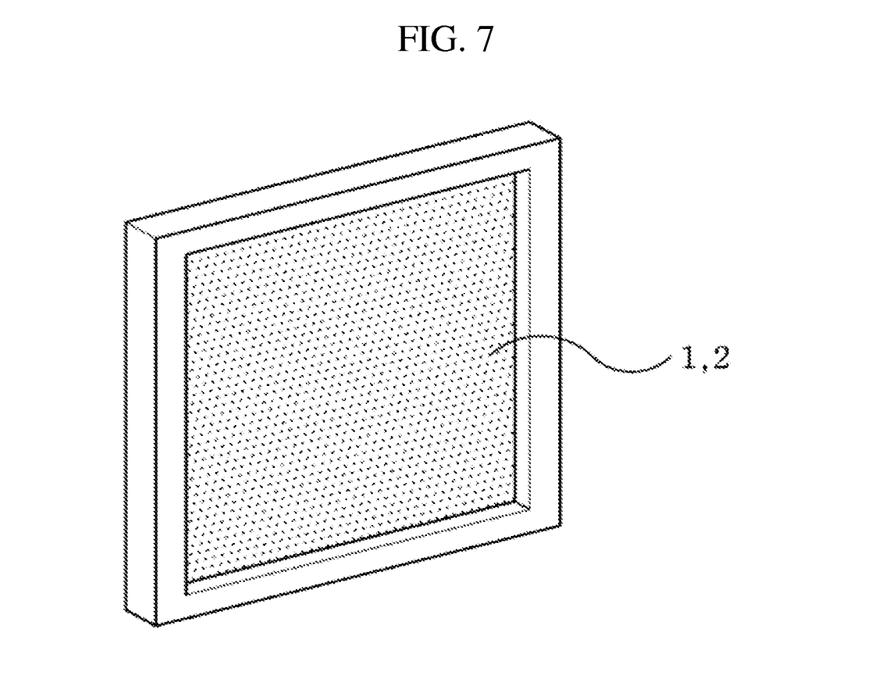
FIGS. 7 and 8 are perspective views of the first or the second graphene filter in a film form and a circular form, respectively.

The first graphene filter 1 may be formed into a film, as shown in FIG. 7. Given in the form of a film, the first graphene filter 1 may be engaged to a rectangular frame.

The first graphene filter 1 engaged to a rectangular frame shows very high tensile strength and compression strength.

Figure 8:
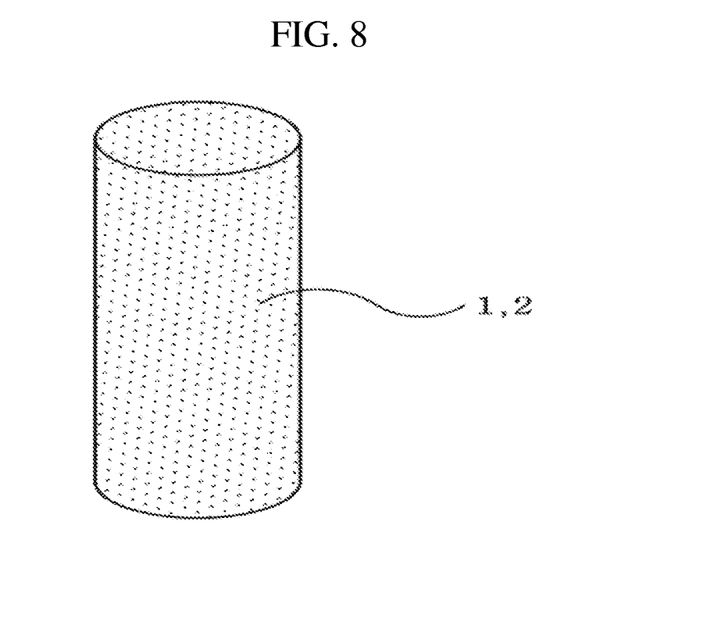

In some embodiments of the present disclosure, the first graphene filter 1 may have a cylindrical form, as shown in FIG. 8. In this case, circular frames may be applied to opposite ends of the cylindrical first graphene filter 1.

The cylindrical first graphene filter 1 engaged with the circular frames shows very high tensile strength and compression strength.

With reference to FIGS. 2 and 5, the second graphene filter 2 may be fabricated by the method illustrated in FIG. 1 using the apparatus, shown in FIG. 4, for manufacturing the porous graphene filter. The second graphene filter 2 has the structure shown in FIG. 3.

The second graphene filter 2 is fabricated in such a way that, during the formation of graphene with carbon atoms generated by the vaporization of the carbon source, a substitution source is vaporized to generate substitution atoms, i.e., nitrogen atoms that cause a crystal defect to a part of the carbon atoms in the graphene and substitute for the carbon atoms having crystal defect.

As shown in FIG. 3, the second graphene filter 2 has a second hole ($H_2$) with a second size (S2). The second size (S2) of the second holes of the second graphene filter 2 is larger than the first size (S1) of the first holes of the first graphene filter 1.

According to some embodiments of the present disclosure, the second size of the second holes ($H_2$) of the second graphene filter 2 may be changed by adjusting the concentration and feed rate of the substitution source relative to the carbon source.

The second graphene filter 2 may be formed into a film, as shown in FIG. 7. Given in the form of a film, the second graphene filter 2 may be engaged to a rectangular frame. The second graphene filter 2 engaged to a rectangular frame shows very high tensile strength and compression strength.

In some embodiments of the present disclosure, the second graphene filter 2 may have a cylindrical form, as shown in FIG. 8. In this case, circular frames may be applied to opposite ends of the cylindrical second graphene filter 2.

The cylindrical second graphene filter 2 engaged with the circular frames shows very high tensile strength and compression strength.

In some embodiments of the present disclosure, both the first and the second graphene filters 1 and 2 may be formed, for example, into films, as shown in FIG. 7. Given in the form of films, the first and the second graphene filters 1 and 2 may be engaged to respective rectangular frames.

Although the first and the second graphene filters 1 and 2 are described to have rectangular film forms and to engage with respective rectangular frames in the foregoing, they may be formed into circular films and engaged to respective circular frames.

The first and the second graphene filters 1 and 2 engaged to respective frames may be arranged at a predetermined distance from each other within the filter body 750 as shown in FIG. 5.

The filter body 750 may have a columnar shape with both or one of the opposite ends open.

For example, the filter body 750 may be a column with open opposite ends responsible for an inlet 752 and an outlet 754, respectively. The filter body 750 may be made of, for example, a metallic or synthetic resin material.

Through the inlet 752 of the filter body 750, a mixture of at least two materials is introduced into the filter body while the resulting filtrate is discharged through the outlet 754.

With reference to FIG. 6, when a mixture of material A larger than the first size (S1) of the first hole ($H_1$) of the first graphene filter 1, material B smaller than the first size (S1) of the first hole ($H_1$) of the first graphene filter 1 and larger than the second size (S2) of the second hole ($H_2$) of the second graphene filter 2, material C, which is a target material, smaller than the second size (S2) of the second hole ($H_2$) of the second graphene filter 2, is introduced into the filter body 750 in which the first and the second graphene filters 1 and 2 are arranged at a predetermined distance from each other, and the target material C passes through both the first hole ($H_1$) of the first graphene filter 1 and the second hole ($H_2$) of the second graphene filter 2 whereas materials A and B cannot proceed through the first hole ($H_1$) of the first graphene filter 1 or the second hole ($H_2$) of the second graphene filter 2.

Figure 9:
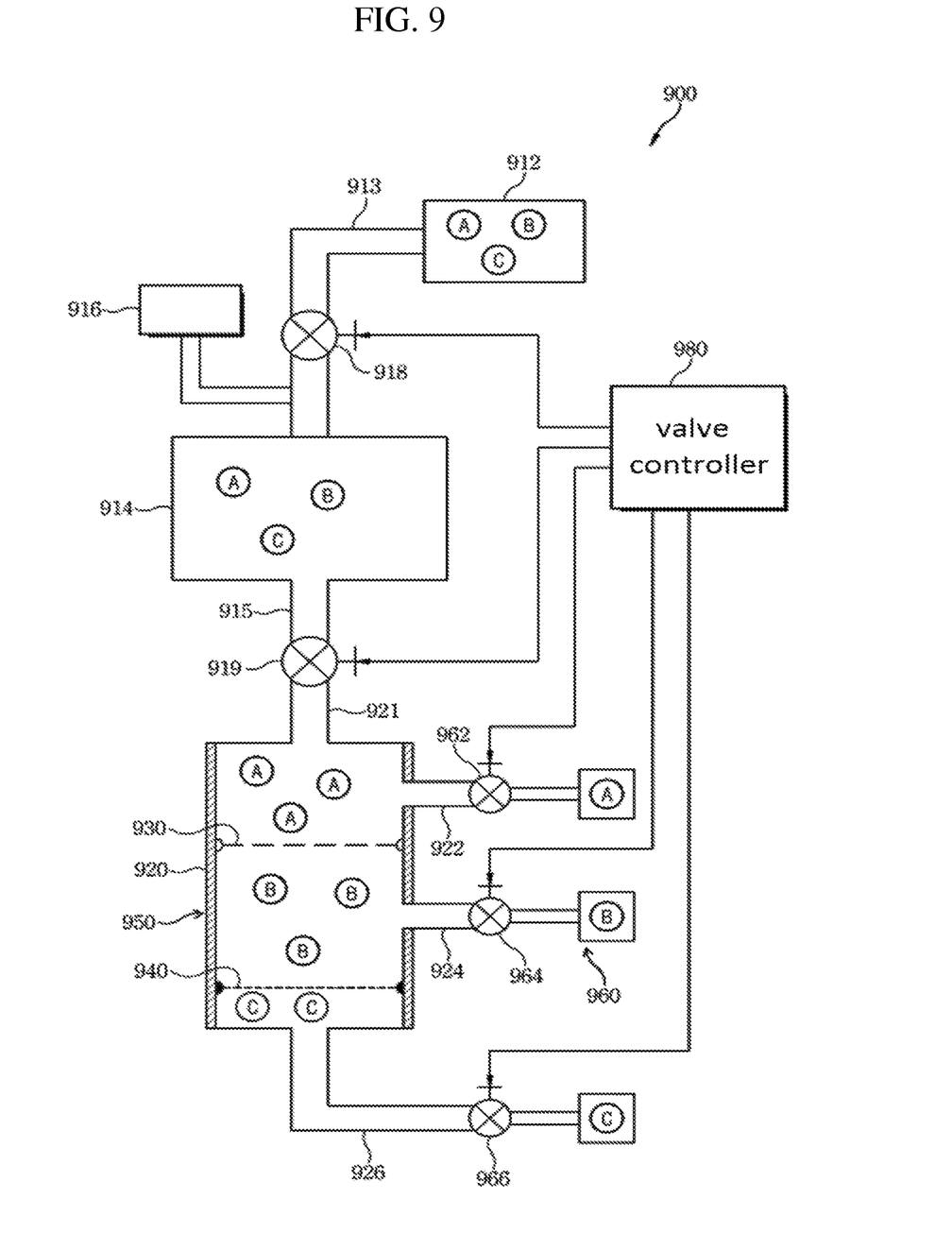
FIG. 9 is a block diagram illustrating a filtering apparatus according to some embodiments of the present disclosure.

FIG. 9 is a block diagram illustrating a filtering apparatus according to some embodiments of the present disclosure.

The filtering apparatus according to FIG. 9 allows for the separation of a mixture of at least two materials different in size into individual materials, and the recovery of the separated individual materials.

The filtering apparatus 900 comprises a mixture feeder, a graphene filter 950, a recovery unit 960, and a valve controller 980.

In the filtering apparatus 900, the mixture feeder feeds a mixture of at least two materials different in size into the graphene filter 950 as will be described later.

The mixture feeder comprises a mixture reservoir 912, a container 914, a discharge unit 916, and electronic valves 918 and 919.

After being provided with a mixture comprising material A with a first size on average, material B with a second size on average smaller than the first size, and material C with a third size on average smaller than the second size from an external source, the mixture reservoir 912 supplies the mixture to the container 914.

The mixture reservoir 912 and the container 914 are connected with each other through a pipe 913 that is associated with an electric valve 918 for allowing or controlling the supply of the mixture into the container 914. The electric valve 918 is opened or closed depending on a control signal from a valve controller 980 as will be described later.

The container 914 is connected with the pipe 913 and temporally stores a predetermined amount of the mixture.

The container 914 is also connected with a discharge pipe 915 for discharging a predetermined amount of the temporally stored mixture, and the discharge pipe 915 is associated with an electric valve 919. This electric valve 919 serves to regulate the supply of the mixture temporally stored in the container 914 to the graphene filter 950 as will be described later.

Likewise, the electric valve 919 is opened or closed depending on a control signal from the valve controller 980 as will be described later.

The discharge unit 916 serves to supply the mixture temporally stored in the container to the graphene filter 950.

For example, the discharge unit 916 may be connected to the pipe 913 and may include a blower for blowing air or inert gas to forcibly carry the mixture stored in the container 914 into the graphene filter 950.

The graphene filter 950 comprises a filter body 920 and graphene films 930 and 940 arranged within the filter body. The filter body is equipped with an inlet 921 connected to the discharge pipe 915 of the container 914, and outlets 922, 924, and 926.

The filter body 920 may have a columnar shape with opposite ends closed. The inlet 921 is provided at an upper portion of the filter body 920 and is connected with the discharge pipe 915 of the container 914. Through the inlet 921, the mixture stored in the container 914 is introduced into the filter body 920.

In the filter body 920, the outlet may be established in such a number as to correspond to the number of the materials present in the mixture.

Because the mixture consists of three materials A, B, and C in some embodiments of the present disclosure, three outlets 922, 924, and 926 are arranged at predetermined distances from each other in the filter body 920.

The graphene films 930 and 940 can be fabricated by the method illustrated in FIGS. 1 to 4, and accordingly a description of the configuration and fabrication method of the graphene films 930 and 940 will be omitted if it overlaps with that given in the foregoing.

The graphene film 930 is arranged in such a way as to block a passage through the filter body 920.

For example, the graphene film 930 has first holes of a first size through which materials B and C can pass, but material A cannot.

The graphene film 930 is positioned between the outlets 922 and 924.

Facing the graphene 930 within the filter body 920, the graphene film 940 is also arranged in such a way as to block a passage through the filter body 920.

For example, the graphene film 940 has second holes of a second size through which material C can pass, but material B cannot.

The graphene film 940 is position between the outlets 924 and 926.

Communicating with the outlets 922, 924, and 926, the recovery unit 960 separately recovers and stores materials A, B, and C from the mixture.

The recovery unit 960 comprises electric valves 962, 964, and 966 for use in selectively recovering and storing materials A, B, and C.

The valve controller 980 produces control signals for opening or closing the electric valves 918, 919, 962, 964, and 966 to selectively recover individual materials from a mixture thereof.

While the graphene filter depicted in FIG. 6 is difficult to apply for the selective filtration or separation of any one of materials A, B, and C from a mixture thereof, the filtering apparatus illustrated in FIG. 9 allows for the selective filtration or separation of materials A, B, and C that are different in size one another.

Below, a description will be given of the role of the filtering apparatus illustrated in FIG. 9 in selectively separating or filtering individual materials from a mixture thereof.

First, a mixture of materials A, B, and C is supplied from the mixture reservoir 912 of the mixture feeder to the container 914 through the pipe 913.

In this regard, the valve controller 980 applies a control signal to the electric valve 918 so as to direct the opening of the electric valve 918 for a predetermined period of time during which a predetermined amount of the mixture is fed into the container 914 through the pipe 913.

When the container 914 is filled with a predetermined amount of the mixture, the valve controller 980 applies a control signal to the electric valve 918 so that the electric valve 918 is closed to block the supply of the mixture to the container 914.

On the other hand, when the container 914 is filled with a predetermined amount of the mixture, the valve controller 980 directs the electric valve 919 connected to the discharge pipe 915 to open, thereby supplying air or inert gas from the discharge unit 916 to the container 916, with the concomitant transmission of the mixture from the container 914 to the graphene filter 850.

After entering the graphene filter 950 from the container 914 through the inlet 921, the mixture reaches the graphene film 930 with first holes of the first size formed therein. Materials B and C of the mixture pass through the first holes whereas material A cannot pass through the holes, thereby remaining on the graphene film 930.

Materials B and C, after passing the graphene film 930, reach the graphene film 940, with second holes of the second size formed therein, at which material C passes through the second holes while material B remaining on the graphene film 940.

Accordingly, while a predetermined amount of the mixture is supplied from the container 914 to the graphene filter 950, materials A, B, and C are separated individually by the graphene films 930 and 940 of the graphene filter 950.

As such, materials A, B, and C that are divided from one another by the graphene films 930 and 940 are individually recovered through the respective outlets 922, 924, and 926 into the recovery unit 960. The valve controller 980 produces control signals directing the opening and closing of the electric valves 962, 964, and 966 respectively connected to the outlets 922, 924, and 926.

In accordance with some embodiments of the present disclosure, the mixture may comprise gaseous, liquid, or solid materials different in size.

In accordance with some embodiments of the present disclosure, the filtering apparatus may find applications in a variety of fields including the medical field, the filtration field for specific gas separation, etc.

As elucidated hitherto, graphene films consisting of a monoatomic layer structure can be fabricated in such a way that holes of predetermined sizes are formed therein during graphene formation, and the resulting porous graphene films are used as graphene filters to selectively filter or separate specific materials from a mixture containing the materials.

Embodiments illustrated in the drawings are set forth to illustrate, but are not to be construed as limiting the present invention. It should be apparent to those skilled in the art that although many specified elements such as concrete components are elucidated in the following description, they are intended to aid the general understanding of the invention and the present invention can be implemented without the specified elements.

What is claimed is:

1. A method for manufacturing a porous graphene filter, comprising:
forming a first graphene filter including first holes with a first size on average, carbon atoms and nitrogen atoms bonded to broken covalently bonded portions of the carbon atoms of the first graphene filter, during deposition of carbon atoms generated from a first carbon source for formation of graphene, by substituting a part of the carbon atoms generated from the first carbon source with the nitrogen atoms causing crystal defects in the first graphene filter and generated from a first substitution source;
forming a second graphene filter including second holes with a second size on average, carbon atoms and nitrogen atoms bonded to broken covalently boned portions of the carbon atoms of the second graphene filter, during deposition of carbon atoms generated from a second carbon source for formation of graphene, by substituting a part of the carbon atoms generated from the second carbon source with the nitrogen atoms causing crystal defects in the second graphene filter and generated from a second substitution source;
arranging the first graphene filter and the second graphene filter in a filter body equipped with an inlet and an outlet,
wherein the first size of the first holes is greater than the second size of the second holes, and
wherein a size of a largest hole among the second holes of the second graphene filter is smaller than a size of a smallest hole among the first holes of the first graphene filter so that each material of a plurality of materials in a mixture is selectively passed and filtered through the first holes and the second holes to filter out a material that can pass through the first holes but not through the second holes between the first graphene filter and the second graphene filter.

2. The method of claim 1, wherein the first and second substitution sources respectively used in the formation of the first graphene filter having the first holes and the second graphene filter having the second holes independently contain a nitrogen atom.

3. The method of claim 1, wherein the second substitution source is provided in a smaller amount in the formation of the first graphene filter compared to the first substitution source in the formation of the second graphene filter.

4. The method of claim 1, wherein each of the first carbon source and the second carbon source for the first and the second graphene filters contains at least one selected from the group consisting of methane ($CH_4$), methanol ($CH_3OH$), carbon monoxide (CO), ethane ($C_2H_6$), ethylene ($C_2H_4$), ethanol ($C_2H_5OH$), acetylene ($C_2H_2$), acetone ($CH_3COCH_3$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$).

5. The method of claim 1, wherein each of the first substitution source and the second substitute source for the first and the second graphene filters contains at least one selected from the group consisting of ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3$)$_2$NCHO), lithium nitride ($Li_3N$), and cyanuric chloride ($C_3Cl_3N_3$).

6. The method of claim 1, wherein the first carbon source and the first substitution source for the first graphene filter are simultaneously vaporized when the first graphene filter is formed and the second carbon source and the second substitution source for the second graphene filter are simultaneously vaporized when the second graphene filter is formed.

7. A porous graphene filter, comprising:
a first graphene filter including first holes with a first size on average, carbon atoms and nitrogen atoms bonded to broken covalently bonded portions of the carbon atoms of the first graphene filter, the first holes being formed by substituting a part of carbon atoms at covalently bonded portions in the first graphene filter with the nitrogen atoms causing crystal defects in the first graphene filter;
a second graphene filter including second holes with a second size on average, carbon atoms and nitrogen atoms bonded to broken covalently boned portions of the carbon atoms of the second graphene filter, the second holes being formed by substituting a part of carbon atoms at covalently bonded portions in the second graphene filter with the nitrogen atoms causing crystal defects in the second graphene filter; and
a filter body in which the first graphene filter and the second graphene filter are immobilized against a path through which a mixture of a plurality of materials moves after the mixture is introduced into the filter body,
wherein the first size of the first holes is greater than the second size of the second holes, and
wherein a size of a largest hole among the second holes of the second graphene filter is smaller than a size of a smallest hole among the first holes of the first graphene filter so that each material of the mixture is selectively passed and filtered through the first holes and the second holes to filter out a material that can pass through the first holes but not through the second holes between the first graphene filter and the second graphene filter.

8. The porous graphene filter of claim 7, wherein the first graphene filter and the second graphene filter are independently in a film or cylindrical form.

9. A filtering apparatus, comprising:
a mixture feeder for intermittently providing a predetermined amount of a mixture consisting of materials different in size from each other,
a graphene filter comprising:
a filter body equipped with an inlet through which the mixture is introduced into the filter body, and at least two outlets at a side of the filter body; and
a first graphene film and a second graphene film positioned between the outlets within the filter body, for separating the individual materials of the mixture from each other; and
a recovery unit, connected to the outlets, for recovering the separated individual materials,
wherein the first graphene film includes first holes with a first size on average, carbon atoms and nitrogen atoms bonded to broken covalently bonded portions of the carbon atoms of the first graphene film, the first holes being formed by substituting a part of carbon atoms at covalently bonded portions in the first graphene film with the nitrogen atoms causing crystal defects in the first graphene film, wherein the second graphene film includes second holes with a second size on average, carbon atoms and nitrogen atoms bonded to broken covalently bonded portions of the carbon atoms of the second graphene film, the second holes being formed by substituting a part of carbon atoms at covalently bonded portions in the second graphene film with the nitrogen atoms causing crystal defects in the second graphene film, wherein the first size of the first holes is greater than the second size of the second holes, and wherein a size of a largest hole among the second holes of the second graphene film is smaller than a size of a smallest hole among the first holes of the first graphene film so that each material of the mixture is selectively passed and filtered through the first holes and the second holes to filter out a material that can pass through the first holes but not through the second holes between the first graphene film and the second graphene film.

10. The filtering apparatus of claim 9, wherein the mixture feeder comprises:

a mixture reservoir for supplying the mixture;

a container for receiving a predetermined amount of the mixture; and a discharge unit for discharging the mixture from the container.

11. The filtering apparatus of claim 10, wherein the discharge unit comprises a blower for providing air or inert gas to the container.

12. The filtering apparatus of claim 9, further comprising:

electric valves associated with the mixture feeder, the graphene filter, and the recovery unit; and a valve controller for controlling the electric valves.

\* \* \* \* \*